United States Patent [19]
Kato et al.

[11] Patent Number: 5,796,613
[45] Date of Patent: Aug. 18, 1998

[54] NAVIGATION SYSTEM FOR VEHICLES INCLUDING PRESENT POSITION CALCULATING MEANS

[75] Inventors: Shinichi Kato; Mitsuhiro Nimura; Masaharu Hanasaki; Akimasa Nanba, all of Anjo, Japan

[73] Assignee: Aisin AW Co., Ltd., Anjo, Japan

[21] Appl. No.: 510,088

[22] Filed: Aug. 1, 1995

[30] Foreign Application Priority Data

Sep. 1, 1994 [JP] Japan .................. 6-208415
Sep. 23, 1994 [JP] Japan .................. 6-254416

[51] Int. Cl.$^6$ ............... G01C 21/00; G01C 22/00
[52] U.S. Cl. ............... 364/449.8; 364/449.95; 342/457
[58] Field of Search ............ 364/449.7, 449.8, 364/449.95, 561; 342/357, 457

[56] References Cited

U.S. PATENT DOCUMENTS

| | | | |
|---|---|---|---|
| 4,140,970 | 2/1979 | Graziano | 324/166 |
| 5,276,451 | 1/1994 | Odagawa | 342/357 |
| 5,483,457 | 1/1996 | Shibata et al. | 364/454 |
| 5,525,998 | 6/1996 | Geier | 342/357 |
| 5,539,398 | 7/1996 | Hall et al. | 340/907 |

FOREIGN PATENT DOCUMENTS

| | | |
|---|---|---|
| 0 580 167 | 1/1994 | European Pat. Off. |
| 5-209756 | 8/1993 | Japan. |

Primary Examiner—Michael Zanelli
Attorney, Agent, or Firm—Burns, Doane, Swecker & Mathis, LLP

[57] ABSTRACT

In order to calculate the traveling distance and heading of a vehicle in highly accurate fashion, a navigation system is provided with a distance sensor for outputting pulses in proportion to rotation of a wheel, a GPS receiving unit for calculating vehicle speed by GPS reception, acquisition unit for acquiring the number of pulses at the same time as GPS reception, distance correction coefficient calculating unit for calculating GPS traveling distance from the GPS-reception vehicle speed and a time difference between any two points, and calculating a distance correction coefficient from the GPS traveling distance and a pulse difference between two points, and present position calculating unit for calculating present position based upon a corrected distance correction coefficient.

16 Claims, 12 Drawing Sheets

FIG. 12

| Estimated heading error | Correction coefficient |
|---|---|
| Greater than 0°, less than 5° | 1/1 |
| Greater than 5°, less than 10° | 1/2 |
| Greater than 10°, less than 15° | 1/4 |
| Greater than 15°, less than 20° | 1/8 |
| Greater than 20° | 0 |

NAVIGATION SYSTEM FOR VEHICLES INCLUDING PRESENT POSITION CALCULATING MEANS

BACKGROUND OF THE INVENTION

This invention relates to a vehicular navigation system for calculating the traveling distance and heading of a vehicle with a high precision, sensing the present position of the vehicle and providing guidance from the sensed present position to a desired destination.

In a vehicular navigation system, a distance sensor is used to sense a number of pulses outputted in proportion to the rotation of a tire, by way of example, and distance traveled is calculated by multiplying the number of pulses by a distance per unit pulse. The angle of rotation of the vehicle is calculated using a heading sensor, the present position of the vehicle is determined from the distance traveled and the angle of rotation, and the present position of the vehicle is collated with map data and displayed on a display unit. In this case, use may also be made of a global positioning system (GPS) to determine the absolute position of the vehicle for the purpose of correcting the present position.

Tire diameter changes with aging of the tire and with a change in air pressure inside the tire. Consequently, in the above-described method of calculating traveling distance, it is required that the distance per unit pulse be corrected when the tire is replaced in order to assure accuracy in distance measurement. To this end, calculation includes multiplication by a distance correction coefficient. However, the operation for effecting the correction by the distance correction coefficient is very difficult for the user of the navigation system to perform.

In order to solve this problem, the specification of Japanese Patent Application Laid-Open No. 5-209756 proposes obtaining the linear distance between two locations measured by a GPS and the linear distance between estimated positions at these two locations, and revising the distance correction coefficient in such a manner that these two linear distances will coincide.

In the method of performing the distance correction using the distance between two points, namely the present position and the immediately preceding position, by obtaining positional coordinating from a GPS as in the above-mentioned Japanese Patent Application Laid-Open No. 5-209756, the position measured by the GPS fluctuates owing to the disposition of the satellite and the state of radio wave reception. As a result, in order to assure a certain degree of accuracy in the calculation of the distance correction coefficient, it is required that the number of samplings be increased.

However, in a case where the distance between two points is used, a fixed distance must be traveled to assure a certain degree of accuracy. This means a longer sampling interval and a smaller number of samplings. Furthermore, in a case where a filter is provided to filter out samplings having a poor reception precision for the purpose of improving accuracy, or in a case where radio waves cannot be received because the vehicle is between mountains or in the shadow of buildings, the number of samplings is reduced. This makes it necessary to take a large number of samplings over short intervals. However, shortening the sampling interval, i.e., sampling the distance between the two points, means greatly diminishing precision.

With regard to detection of heading, the specification of Japanese Patent Application Laid-Open No. 6-66577 discloses a vehicular navigation system in which heading is sensed by a geomagnetic sensor for sensing geomagnetism, left-right wheel sensors for sensing a difference between the number of revolutions of the left and right front wheels of the vehicle in order to revise an error in the geomagnetic sensor which can occur when there is a disturbance in the magnetic field, and a steering sensor for applying compensation in a case where the left-right wheel sensors become inoperative at low speeds of less than 3.5 km/h. This is supplemented by estimating the heading of the vehicle using a GPS in which position is sensed by receiving radio waves from an artificial satellite. When a road nearest to the present position of the vehicle has been selected by map matching, the bearing of this road, which has been stored as map information, and the estimated heading are compared and a vehicle heading which coincides with the road bearing is decided. In a navigation system of this kind, radio waves from the GPS satellite are received and used to calculating heading. However, if the vehicle is traveling at low speed or is executing a left or right turn, a sufficient accuracy cannot be obtained with regard to determination of heading by the Doppler effect. In such case the GPS heading is not employed.

In detection of heading in the conventional navigation system, a GPS heading is employed only when the vehicle speed is greater than a predetermined value, in view of the fact that heading accuracy declines if the vehicle is traveling at low speed or is executing a left or right turn. As a consequence, correction of heading by employing the GPS heading becomes less frequent and heading accuracy declines as a result. Further, even if the vehicle speed is greater than the predetermined value, there are occasions where the accuracy of the GPS heading declines, as when the disposition of the GPS satellite or the radio wave reception is poor. If heading is corrected using the GPS heading in such case, the heading may instead be corrected to the wrong heading and heading accuracy will be diminished as a result.

SUMMARY OF THE INVENTION

Accordingly, with regard to calculating vehicle traveling distance and heading with a high degree of accuracy, a first object of the present invention is to provide a vehicle navigation system in which the number of correction-coefficient calculation cycles is increased at short traveling distances, thereby making it possible to calculate vehicle traveling distance very accurately and to inform of the present position of the vehicle in precise fashion.

A second object of the present invention is to provide a vehicle navigation system in which use is made of an estimated heading error calculated based upon the disposition of a GPS satellite and the traveling speed of the vehicle, thereby improving heading accuracy.

According to the present invention, the first object is attained by providing a vehicular navigation system comprising a distance sensor for outputting pulses in proportion to rotation of a wheel, a GPS receiving unit for calculating vehicle speed by GPS reception, acquisition means for acquiring the number of pulses at the same time as GPS reception, distance correction coefficient calculating means for calculating GPS traveling distance from the GPS-reception vehicle speed and a time difference between any two points, and calculating a distance correction coefficient from the GPS traveling distance and a pulse difference between two points, and present position calculating means for calculating present position based upon a corrected distance correction coefficient. In the present position calculating means, the pulse difference between the two points outputted by the distance sensor is multiplied by a distance per pulse, which is preset for each vehicle, and by the distance correction coefficient, whereby the traveling distance is calculated. The GPS traveling distance is calculated by multiplying the average value of the GPS-reception vehicle speeds at the two points by the time difference. In the distance correction coefficient calculating means, the number of pulses necessary to advance a unit distance is calculated from the GPS traveling distance and the pulse difference, and the distance correction coefficient is calculated by the formula {(unit distance)/(number of pulses necessary to advance one unit distance)}/(distance per pulse)

By virtue of the above-described arrangement, the number of pulses capable of being obtained from the distance sensor is stored instantaneously so as to be simultaneous with reception time when there is a reception from a GPS. As a result, the distance correction coefficient can be calculated based upon vehicle speed from the GPS reception unit. Accordingly, since the sampling for distance correction is vehicle speed, there is no decline in accuracy even if many samplings are taken at short intervals. Unlike the prior art, therefore, it is no longer necessary to travel a fixed distance in order to improve accuracy. Further, the sampling interval is short and the number of samplings large. Consequently, in a case where samplings resulting from poor reception accuracy or samplings which do not satisfy fixed conditions are filtered out, or in a case where radio waves cannot be received because the vehicle is between mountains or in the shadow of buildings, the number of samplings is fairly large in comparison with the prior art and, hence, there is not much decline in accuracy. Accordingly, the distance correction coefficient can be calculated with high precision at all times, thus making it possible to inform of the present position of the vehicle in accurate fashion.

According to the present invention, the second object is attained by providing a vehicular navigation system comprising receiving means for receiving a signal from a satellite, heading calculating means for calculating heading of the vehicle based upon a signal from the receiving means, satellite position sensing means for sensing the position of the satellite based upon the signal from the receiving means, traveling speed sensing means for sensing traveling speed of the vehicle, heading error estimating means for estimating error in the heading, obtained by the heading calculating means, based upon the traveling speed obtained by the traveling speed sensing means and the position of the satellite obtained by the satellite position sensing means, and judging means for judging whether the estimated heading error, which has been estimated by the heading error estimating means, is less than a predetermined value, wherein the heading calculated by the heading calculating means is employed when the estimated heading error is less than the predetermined value.

According to the present invention, the second object is attained by providing a vehicular navigation system comprising receiving means for receiving a signal from a satellite, heading calculating means for calculating heading of the vehicle based upon a signal from the receiving means, satellite position sensing means for sensing the position of the satellite based upon the signal from the receiving means, traveling speed sensing means for sensing traveling speed of the vehicle, heading error estimating means for estimating error in the heading, obtained by the heading calculating means, based upon the traveling speed obtained by the traveling speed sensing means and the position of the satellite obtained by the satellite position sensing means, judging means for judging whether the estimated heading error, which has been estimated by the heading error estimating means, is less than a predetermined value, heading estimating means for estimating heading of the vehicle, correction quantity calculating means for calculating a correction quantity that is for correcting the estimated heading, estimated by the heading estimating means, based upon the heading calculated by the heading calculating means and the estimated heading error estimated by the heading error estimating means, and heading correcting means for correcting the estimating heading, estimated by the heading estimating means, based upon the correction quantity calculated by the correction quantity calculating means.

According to the present invention, the second object is attained by providing a vehicular navigation system comprising receiving means for receiving a signal from a satellite, heading calculating means for calculating heading of the vehicle based upon a signal from the receiving means, satellite position sensing means for sensing the position of the satellite based upon the signal from the receiving means, traveling speed sensing means for sensing traveling speed of the vehicle, heading error estimating means for estimating error in the heading, obtained by the heading calculating means, based upon the traveling speed obtained by the traveling speed sensing means and the position of the satellite obtained by the satellite position sensing means, judging means for judging whether the estimated heading error, which has been estimated by the heading error estimating means, is less than a predetermined value, heading estimating means for estimating heading of the vehicle, correction quantity calculating means which, when it is judged by the judging means that the estimated heading error is less than the predetermined value, is for calculating a correction quantity that is for correcting the estimated heading, estimated by the heading estimating means, based upon the heading calculated by the heading calculating means and the estimated heading error estimated by the heading error estimating means, and heading correcting means for correcting the estimated heading, estimated by the heading estimating means, based upon the correction quantity calculated by the correction quantity calculating means.

By virtue of the arrangement described above, heading error at the time of reception is estimated with regard to GPS heading calculated based upon the signal from the receiving means, thereby making it possible to check the degree of precision of the GPS heading obtained at this time. On the basis of estimated heading error, a decision is rendered as to whether to employ the calculated GPS heading. When the estimated heading error is less than the predetermined value, the GPS heading calculated from the signal received at this time is employed. As a result, a heading having a high degree of accuracy can be used at all times.

Further, the correction quantity is calculated in dependence upon the estimated heading error and the estimated heading from the heading estimating means estimating the heading of the vehicle is corrected, thereby providing a highly precise vehicle heading. Furthermore, only a highly accurate GPS heading having a small estimated heading error is employed, and the estimated heading is corrected based upon the estimated heading error. This makes it possible to calculate a more precise vehicle heading.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a table showing the relationship between estimated heading error that has been calculated and a correction coefficient.

DESCRIPTION OF THE PREFERRED EMBODIMENT

An embodiment of the present invention will now be described with reference to the drawings.

Figure 2:
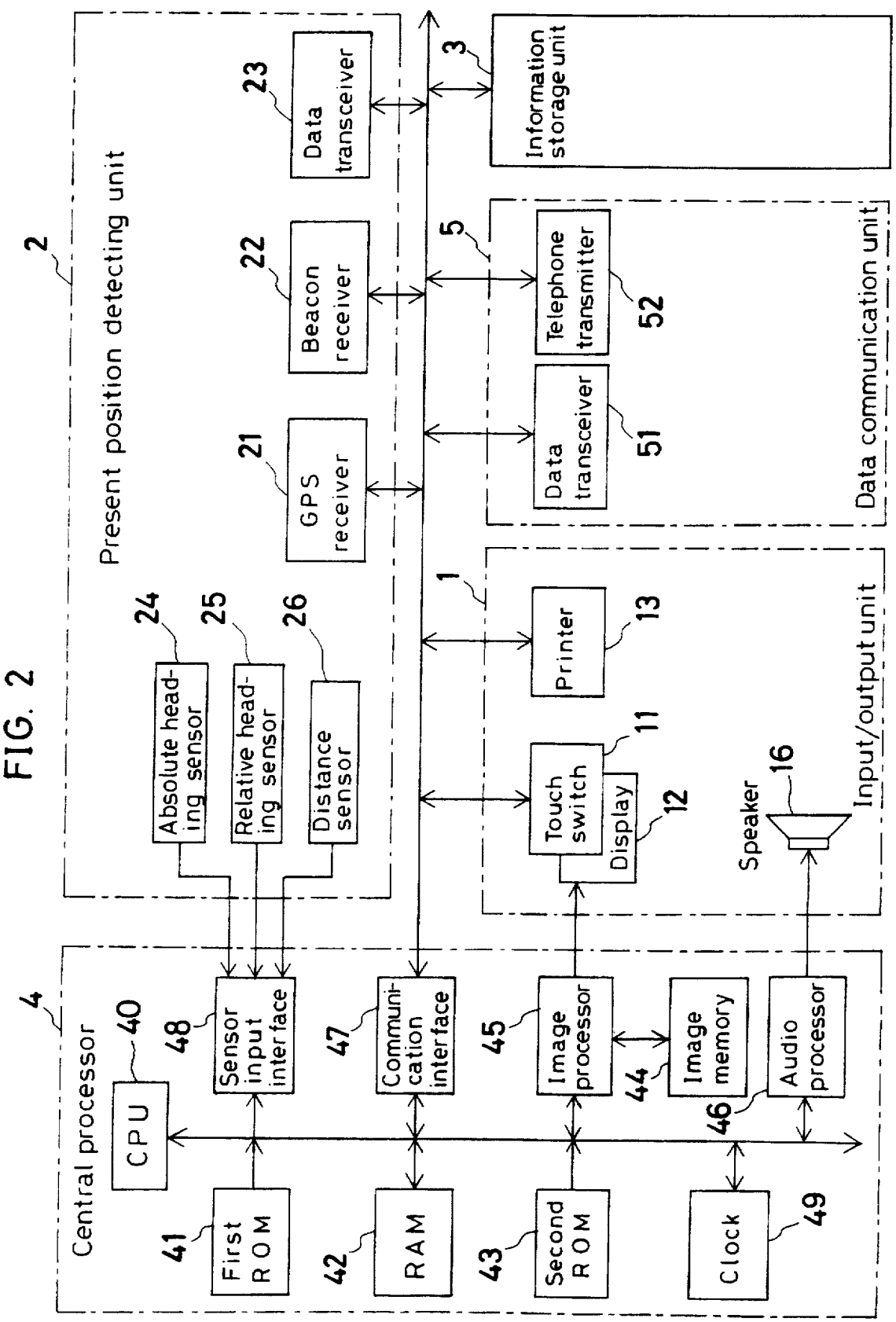
FIG. 2 is a block diagram showing the overall construction of a vehicular navigation system according to the present invention.

As illustrated in FIG. 2, the vehicular navigation system according to the present invention comprises an input/output unit 1 for inputting/outputting information relating to route guidance, a present position sensing unit 2 for sensing information relating to the present position of the vehicle, an information storage unit 3 in which navigation data necessary for route calculation and guidance data necessary for route guidance have been recorded, and a central processor 4 for executing route search processing and video/audio guidance processing that is required for route guidance, and for performing overall control of the system.

The input/output unit 1 functions to allow the driver to enter information necessary for setting starting point, destination and transit points, to instruct the central processor 4, at the volition of the driver, to execute navigation processing in such a manner that guidance information can be outputted by voice and/or by a display on a display screen, and to print out processed data and data involved in data communication. Means for implementing these functions include an input section and an output section. The input section comprises switches such as touch switches 11 and key switches for entering locations in the form of telephone numbers or coordinates in order to set locations such as a designation or transit point, for requesting route guidance and switching mode. The output section has a display 12 for displaying input data on a screen and, in response to a request from the driver, for automatically displaying route guidance on the screen, a printer 13 for printing out data processed by the central processor 4 and data that has been stored in the information storage unit 3, and a speaker 13 for outputting route guidance by voice.

The display 12 is constituted by a color CRT or color liquid-crystal display device. On the basis of map data and guidance data processed by the central processor 4, the display 12 outputs, as a color display, all screens necessary for navigation, such as a route setting screen, a screen of an interval view and a screen of intersections. The display 12 also displays buttons for setting route guidance and for changing over guidance and screens during the course of route instruction. In particular, transit-intersection information such as the names of intersections to be traversed are displayed in color in the form of a pop-up menu on the interval display screen.

The display 12 is provided inside the instrument panel in the vicinity of the driver's seat. Observing an interval view enables the driver to ascertain the present location of the vehicle and to obtain information regarding a route from this location. The display 12 is provided with the touch panel 11 that corresponds to the display of function buttons. The arrangement is such that the operations described above are executed based upon signals entered by touching the function buttons. Several key switches are provided at the periphery of the screen. The arrangement is such that pressing a key switch executes mode changeover to a guidance mode or destination setting mode. Input signal generating means constituted by the key switches and touch switches 11 constructs the input section.

The present-position sensing unit 2 has a GPS receiver 21 which utilizes a global positioning system (GPS), a beacon receiver 22, a data transceiver 23 for receiving a GPS correction signal utilizing a cellular phone or FM multiplex signal, an absolute heading sensor 24 constituted by a geomagnetic sensor or the like, a relative heading sensor 25 constituted by a wheel sensor, steering sensor or gyro, etc., and a distance sensor 26 for sensing traveling distance from the number of revolutions of a wheel. The absolute heading sensor 24 and the relative heading sensor 25 function as the heading estimating means set forth in the claims.

The information storage device 3 is a data base in which all necessary data has been recorded, the data being map data inclusive of route guidance, intersection data, node data, road data inclusive of road bearing, photographic data, destination data, guidance-location data, detailed destination data, road name data, branch location data, address data, displayed guidance data and audio guidance data. The information storage device 3 is an optically read recording medium such as a CD-ROM.

The central processor 4 comprises a CPU 40 for executing processing; a first ROM 41 in which are stored a program for executing processing such as route finding, a program for control of display output needed in route guidance and for control of audio output needed in voice guidance, and data required by these programs; a RAM 42 for temporarily storing route guidance information that has been found as well as data undergoing processing; a second ROM 43 in which display information data necessary for route guidance and map display is stored; an image memory 44 in which image data used to display a screen on the display unit is stored; an image processor 45 which, on the basis of a display-output control signal from the CPU 40, extracts image data from the image memory 44 and delivers the data to the display upon subjecting it to image processing; a audio processor 46 which, on the basis of an audio-output control signal from the CPU 40, synthesizes audio data (phrases, single sentences and sounds) read out of the information storage device 3, converts the result to an analog signal and delivers the analog signal to the speaker 16; a communication interface 47 for performing an exchange of input/output data by communication; a sensor-input interface 48 for accepting a sensor signal from the present-position sensor 2; and a clock 49 for entering data and time into internal dialog information. Route guidance is performed in the form of a screen display or audio output. The arrangement is such that the driver can select a screen display or an audio output.

A data communication unit 4 has a data transceiver 51 and a telephone transmitter 52. The data transceiver 51 accumulates a large quantity of route guidance information and transmits/receives data to/from an external information center for, say, VICS or ATIS communication provided in response to a user request, or transmits/receives data for entering location coordinates using destination information which the user has previously stored in an information storage medium (digital data memory means) such as an electronic organizer or IC card. The telephone transmitter 52 automatically implements a telephone transmission for designating a location and acquiring information concerning the surroundings of the location or a telephone transmission for establishing a telephone connection with a destination after the destination has been set.

Figure 3:
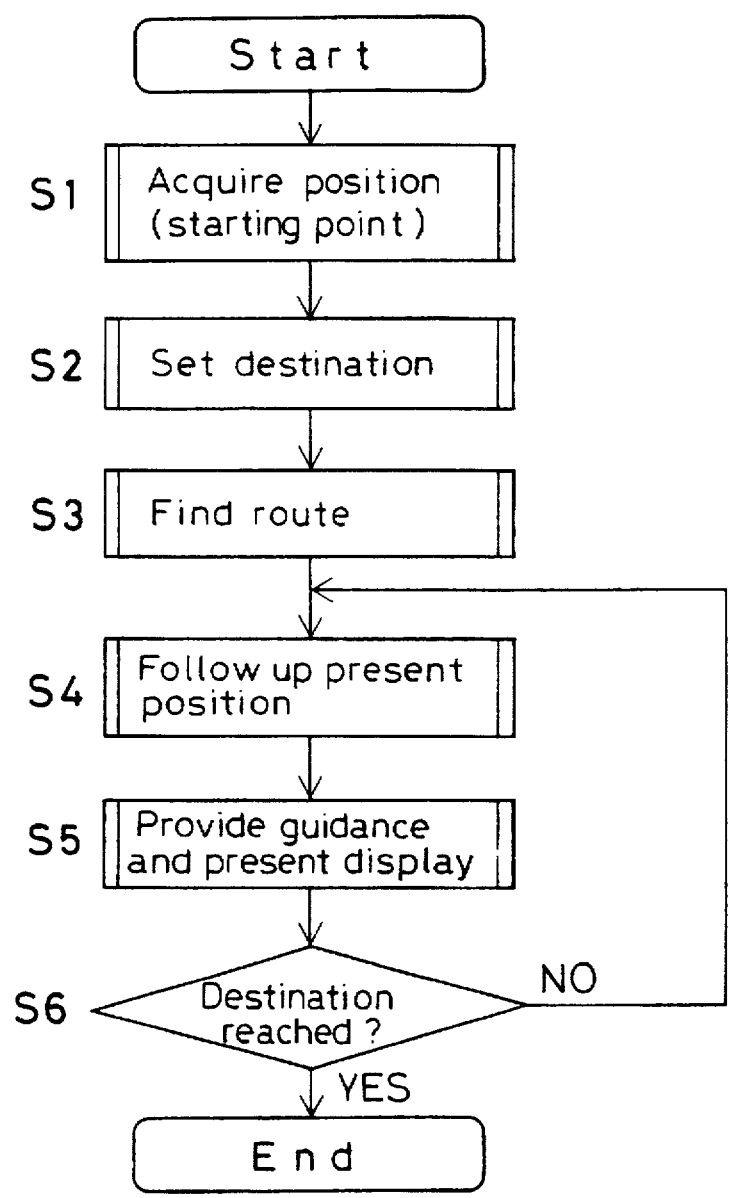
FIG. 3 is a flowchart showing the flow of overall processing of the vehicular navigation system according to the present invention.

FIG. 3 is a flowchart showing the flow of overall processing of the vehicular navigation system according to the present invention. First, the present position (starting point) necessary for finding a route is acquired (step S1). Next, conditions for setting a destination are entered using the destination setting screen, thereby setting a destination (step S2). A search for the route is then executed (step S3). When a guidance start key is pressed on the found route to start route guidance, the position and heading of the vehicle are measured and the present position of the vehicle is followed (step S4). Next, route guidance is performed by audio and/or video based upon the route set (step S5). Further, distance from the present position to the destination is calculated and arrival at the destination is judged based upon whether this distance has become less than a predetermined distance (step S6). If the distance has become less than the predetermined distance, arrival at the destination is judged to have occurred and route guidance is terminated. On the other hand, if the distance from the present position to the destination has not become less than the predetermined distance, the program returns to step S4 and follow-up of the present position continues. This follow-up of present position is carried out by the present position sensing unit 2. The present position of the vehicle is calculated based upon vehicle position and heading signals calculated by the GPS receiving unit shown in FIG. 4, output signals from various sensors and road heading contained in map information.

Figure 4:
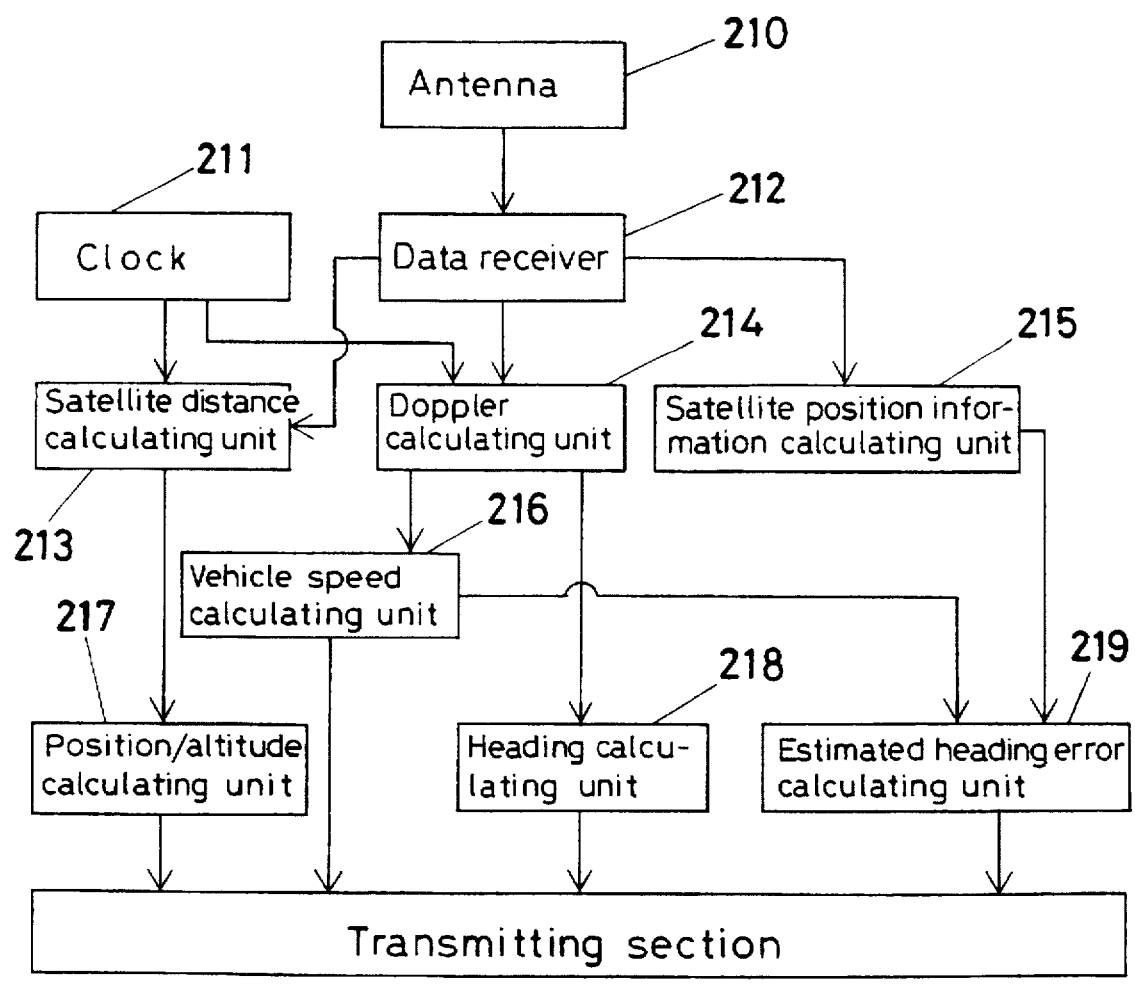
FIG. 4 is a flowchart showing an example of the construction of a GPS receiving unit used in the vehicular navigation system according to the present invention.

The GPS receiving unit in FIG. 4 used in the vehicular navigation system of the present invention receives radio waves from a plurality of satellites via an antenna 210, calculates the present position, vehicle speed, heading and estimated heading error of the vehicle and transmits these items of information via a transmitting section. Upon receiving the radio waves from each satellite via the antenna 210, the data receiver 212 detects the received signal, analyzes navigational messages and extracts data. A satellite distance calculating unit 213 calculates distance to a satellite based upon transmission time at which radio waves are transmitted from the satellite, reception time measured by a clock 211 that has received the radio waves, and position coordinates of the satellite when the radio waves were transmitted. On the basis of these items of information, the present position and altitude of the vehicle are calculated by a position/altitude calculating unit 217. Vehicle speed is calculated by a vehicle speed calculating unit 216, and vehicle heading is calculated by a heading calculating unit 218, using a Doppler value calculated by a Doppler computing unit 214. Furthermore, according to the present invention, the position of each satellite relative to the vehicle is calculated by a satellite position information calculating unit 215. An estimated heading error calculating unit 219 calculates estimated heading error based upon the position of the satellite calculated by the satellite position information calculating unit 215 and vehicle speed calculated by the vehicle speed calculating unit 216. The satellite position information calculating unit 215, the vehicle speed computing unit 216, the heading calculating unit 218 and the estimated heading error calculating unit 219 function as the satellite position sensing means, the traveling speed sensing means, the heading calculating means and the heading error estimating means, respectively, set forth in the claims.

An embodiment of a vehicular navigation system according to the present invention for attaining the first object will now be described with reference to FIG. 1 and FIGS. 5 through 8.

Figure 1:
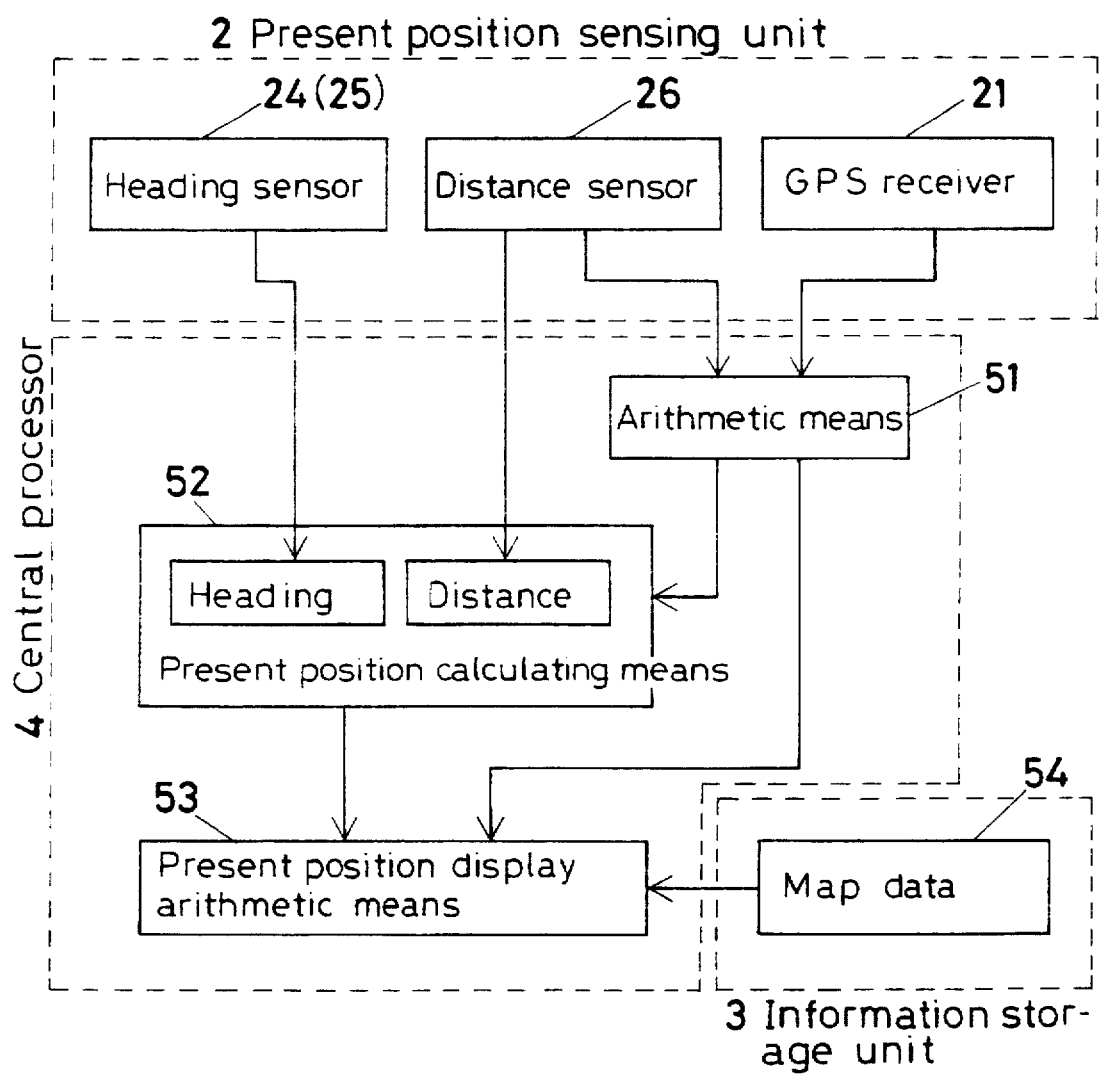
FIG. 1 is a diagram showing the arrangement of principal components of the present invention for attaining the first object of the invention.

As shown in FIG. 1, the signals from the heading sensors (the absolute heading sensor 24 and relative heading sensor 25) in the present position sensing unit 2 are sent to present position calculating means 52 within the central processor 4. The present position calculating means 52 calculates present position from the angle of rotation of the vehicle at two points and the distance traveled between the two points. With regard to the distance traveled, tire diameter changes with aging of the tire and with a change in air pressure inside the tire, and the distance per pulse changes when the tire is replaced. By using this change as a distance correction coefficient and applying it to the signal indicative of traveling distance from the distance sensor 26, an accurate traveling distance is calculated.

The distance correction coefficient is calculated in arithmetic means based upon the number of pulses from the distance sensor 26 and the vehicle speed signal from the GPS receiver unit 21. The distance correction coefficient is applied to the present position calculating means 52 and present position display arithmetic means 53. The present position calculating means 52 calculates the present position (east longitude and north latitude) form the heading signals provided by the heading sensors 24, 25 and the signal indicative of traveling distance corrected based upon the distance correction coefficient from the arithmetic means 51. The present position display arithmetic means 53 calculates the present position, in a form converted from the coordinates of east longitude and north latitude to x, y coordinates on a map, based upon the present position (east longitude and north latitude), map data 54 stored in the information storage unit 3 and the distance correction coefficient from the arithmetic means 51. (In this case, a data-base conversion coefficient for matching with the x, y coordinates on the map is made to act upon the distance correction coefficient.)

According to this embodiment, the heading sensors (the absolute heading sensor 24 and the relative heading sensor 25) and the GPS receiver 21 are used separately. However, an arrangement may be adopted in which the heading obtained from the GPS receiver 21 is used as the heading from the absolute heading sensor.

Figure 5:
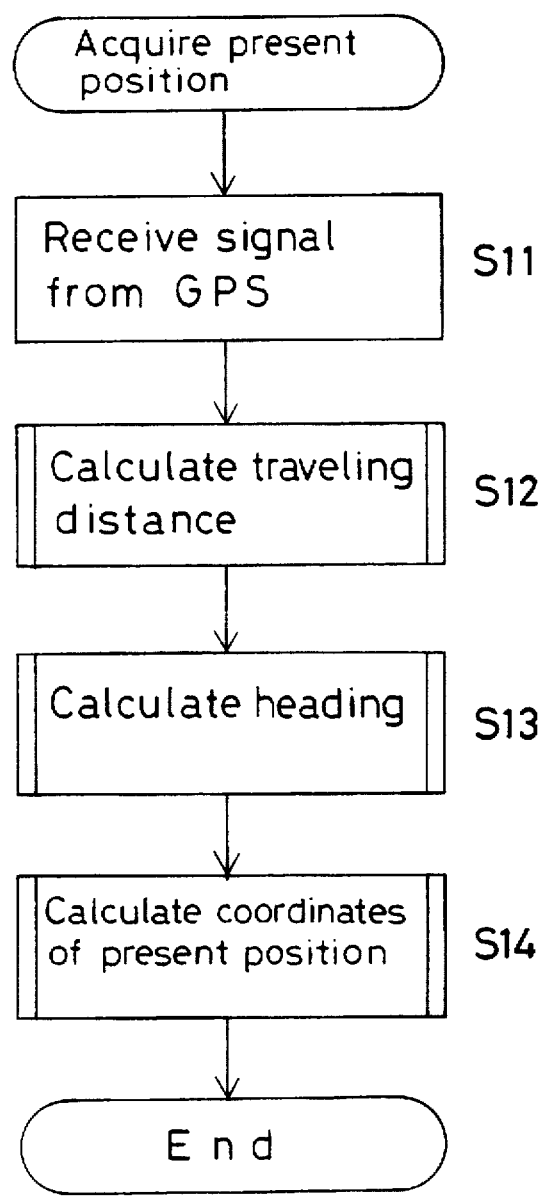
FIG. 5 is a flowchart for describing the flow of processing for acquisition of present position in FIG. 3.

FIG. 5 is a diagram for describing the flow of processing executed to acquire the present position at step S1 in FIG. 3.

At step S11 in FIG. 5, radio waves from the GPS are received by the GPS receiver 21. Processing, described below, for calculating distance traveled is executed at step S12, processing for calculating heading is performed by the heading sensor 24 at step S13, and processing for calculating present position coordinates from the calculated traveling distance and heading is executed at step S14.

Figure 6:
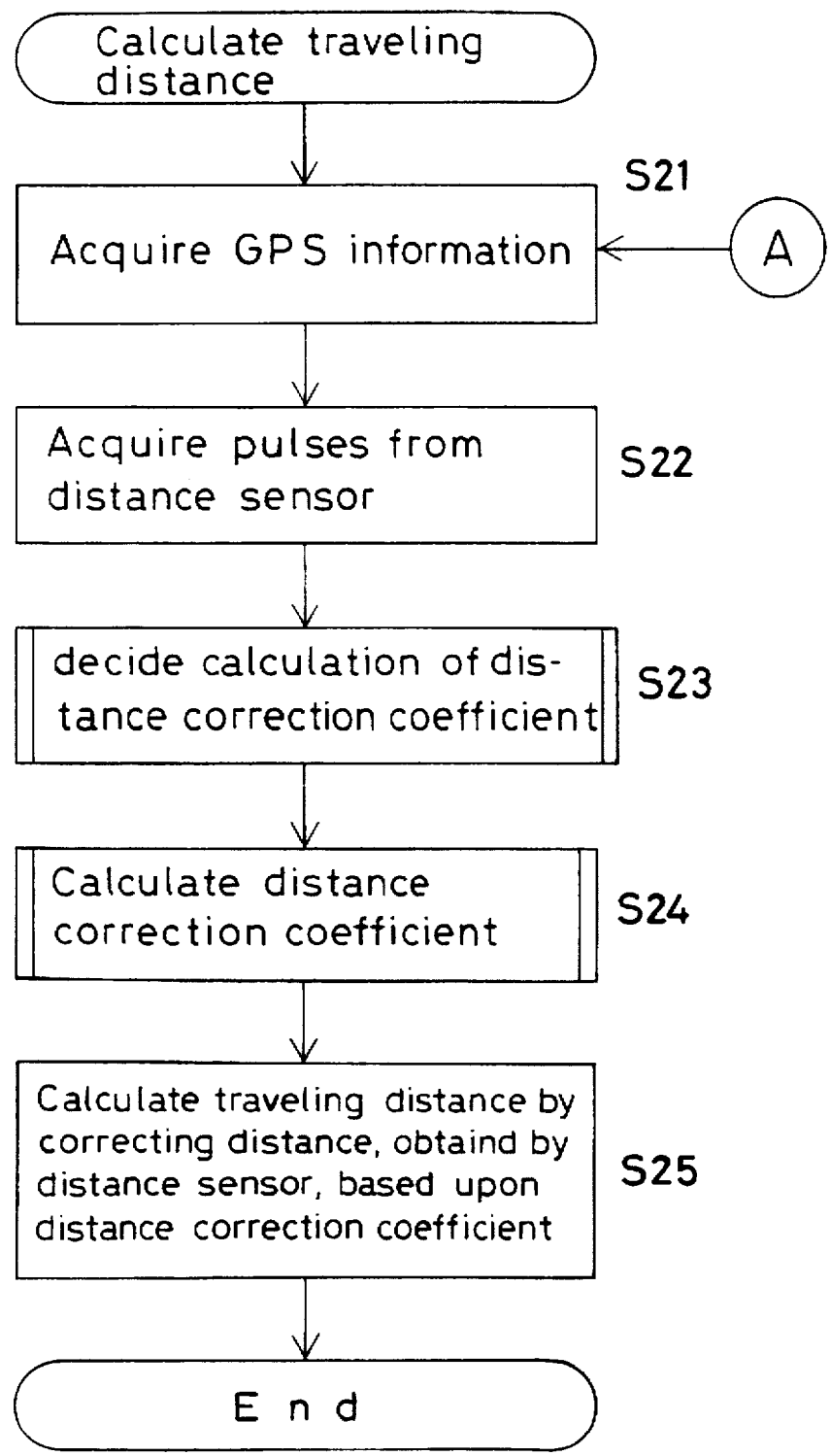
FIG. 6 is a flowchart for describing the flow of processing for calculation of traveling distance in FIG. 5.

FIG. 6 is a flowchart for describing the flow of processing for calculation of traveling distance at step S12 in FIG. 5. At step S21 in FIG. 6, speed, time, heading and a status signal are acquired as GPS information from the GPS receiver 21, pulses are acquired from the distance sensor 26 at step S22 at the same time as GPS reception, and whether the distance correction coefficient is to be calculated is decided at step S23. Calculation, described below, of the distance correction coefficient is performed at step S24, and traveling distance L is calculated at step S25 by revising the distance, obtained by the distance sensor 26, based upon the distance correction coefficient. The traveling distance L is calculated in accordance with the following formula:

$$L = k \times \Delta pls \times (\text{distance per pulse})$$

where k represents the distance correction coefficient and $\Delta pls$ represents a pulse difference between the number (pls) of pulses currently received from the distance sensor and the number ($pls_1$) received previously from the distance sensor. The distance per pulse is set in advance for each vehicle. Furthermore, the processing for calculating the distance traveled is carried out whenever the GPS signal is received. More specifically, the interval at which the GPS signal is received is a prescribed time interval. Since an interval of one second is used generally, the processing for calculating traveling distance also is executed at one-second intervals.

Figure 7:
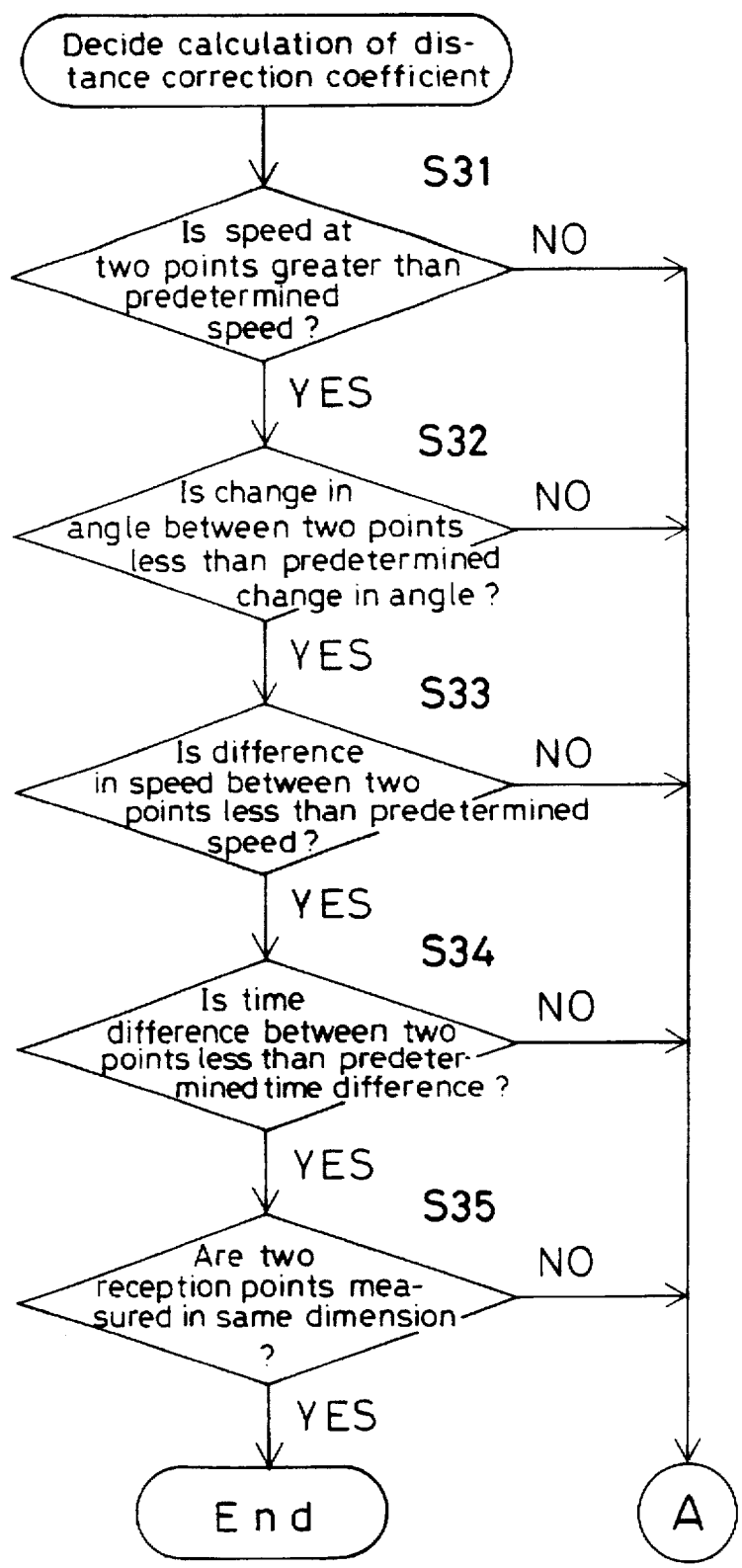
FIG. 7 is a flowchart for describing the flow of processing for judging calculation of a distance correction coefficient in FIG. 6.

FIG. 7 is a flowchart for describing the flow of processing for judging calculation of the distance correction coefficient at step S23 in FIG. 6. Specifically, this processing includes judging, from the speed signal obtained from the GPS receiver 21, whether the speed at two points is greater than a predetermined speed (step S31), judging, from the same heading signal, whether a change in angle between the two points is less than a predetermined angle (step S32), judging, from the same speed signal, whether a speed difference between the two points is less than a predetermined speed difference (step S33), judging, from the same time signal, whether a time difference between the two points is less than a predetermined time difference (step S34) and judging, from the same status signal, whether the two points at which there is reception from the GPS are points at which measurement is performed in the same dimension (e.g., whether the receiving satellites for each of the two points are four in number). If all of the conditions set forth in step S31 to S35 are satisfied, the processing for calculating the distance correction coefficient at step S24 in FIG. 6 is executed. If all of the conditions of steps S31~S35 are not satisfied, then the program returns to step S21 in FIG. 6. By setting the prescribed time in step S34 in such a manner that the time difference between the two points becomes the interval of signal reception from the GPS, the calculation of the distance correction coefficient will be performed only in a case where the GPS signal is employed continuously.

Figure 8:
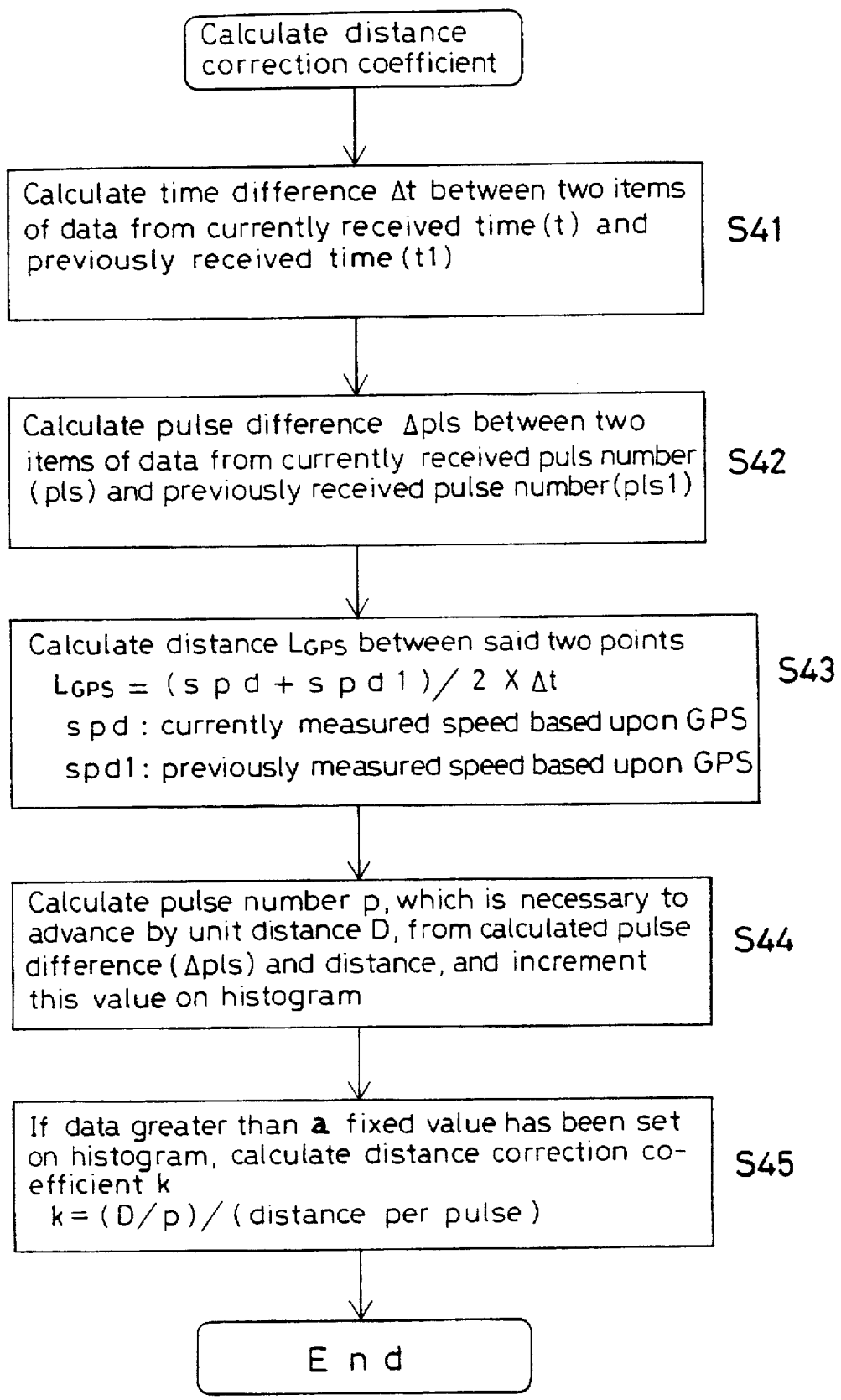
FIG. 8 is a flowchart for describing the flow of processing for calculation of distance correction coefficient in FIG. 6.

FIG. 8 is a flowchart for describing the flow of processing for calculation of the distance correction coefficient at step S24 in FIG. 6. At step S41, a time difference $\Delta t$ between two items of time data is calculated from a time (t) of current GPS reception and a time (t1) of the previous GPS reception. Next, at step S42, the pulse difference $\Delta pls$ between two items of data is calculated from the pulse number (pls) obtained from the distance sensor 26 at the time of current GPS reception and the pulse number ($pls_1$) obtained from the distance sensor 26 at the time of the previous GPS reception. Thus, according to the present invention, an essential requirement is that the time at which the GPS receiver 21 has received the radio waves from the GPS and the number of pulses at such time be stored instantaneously. The reason for this is that when detection of the number of pulses lags behind reception time in a case where the vehicle is traveling at high speed, a fairly larger error is produced at the stage where the data is stored.

Next, at step S43, GPS traveling distance $L_{GPS}$ between the above-mentioned two points is calculated as follows:

$$L_{GPS} = (spd + spd_1)/2 \times \Delta t$$

where spd represents the currently measured speed based on the GPS and $spd_1$ represents the previously measured speed based on the GPS. That is, the GPS traveling distance $L_{GPS}$ can be calculated by multiplying the average value of the speeds at two points based upon GPS reception by the time difference.

Next, at step S44, a number p of pulses necessary to advance the vehicle by a unit distance D (100 m, for example) is calculated from the calculated difference ($\Delta pls$) and GPS traveling distance, and this value is incremented on a histogram. If data greater than a fixed value has been set on the histogram, the data is averaged (step S45) and the distance correction coefficient k is calculated in accordance with the following equation:

$$k = (D/p)/(\text{distance per pulse})$$

Thus distance correction coefficient k thus obtained is used in the present position sensing means 52 of FIG. 1 to correct the traveling distance from the distance sensor 26. As a result, the accuracy of the calculated position coordinates (east longitude, north latitude) is improved. Furthermore, in the present position display arithmetic means 53, the conversion coefficient in the data base for converting the coordinates of east longitude and north latitude to x, y coordinates corresponding to the map data 54 in the information storage unit 3 is made to act upon the distance correction coefficient. As a result, it is possible to carry out accurate matching based upon the distance correction coefficient, the position coordinates from the present position calculating means 52 and the map data 54 in the information storage unit 3. Furthermore, if it so arranged that the distance correction coefficient is calculated only in a case where the GPS signal is received continuously at the GPS reception interval, a more accurate calculation of position can be performed.

The present invention is not limited to the foregoing embodiment but can be modified in a variety of ways. For example, in the foregoing embodiment, whether or not the distance correction coefficient is to be calculated is judged from the heading signal of GPS reception. However, an arrangement may be adopted in which the judgment is made based upon the signals from the heading sensors on the vehicle side.

Furthermore, in the foregoing embodiment, it is described that the distance correction coefficient is calculated in such a manner that the distance error of the pulse width (distance per pulse), which error is ascribable to the effects of a change in tire diameter caused by tire aging, wear and a change in internal air pressure, will take on an appropriate value. However, in a case where the system is installed in a vehicle having a different pulse width (distance per pulse), a fixed pulse width can be set in advance, a correction quantity can be calculated with respect to this set pulse width and the correction coefficient can be calculated so as to obtain an appropriate pulse width. This makes it possible to perform a distance correction that corresponds to all types of vehicles.

An embodiment of a vehicular navigation system according to the present invention for attaining the second object will now be described with reference to FIGS. 9 to 12.

In GPS heading for calculating heading based upon data received from a satellite, an error develops in the heading in dependence upon the position of the satellite and the speed of the vehicle. For example, the heading error becomes large or small when the direction of the satellite and the disposition thereof change with respect to the vehicle. Further, even if the position (disposition) of a satellite is the same, the heading error changes also in dependence upon the vehicle speed at the time of reception. Accordingly, the estimated heading error calculating unit 219 described in FIG. 4 estimates this heading error. As for the method of calculation, the estimated heading error is calculated using Equation (1) below obtained based upon experimental data.

$$\text{estimated heading error} = A \times HDOP/V \tag{1}$$

This error is outputted in the form of an angle. In Equation (1), A represents a constant (e.g., 100), HDOP the rate of decline in accuracy of a two-dimensional position in the horizontal direction, and V the vehicle speed. Furthermore, in this embodiment, the estimated heading error is calculated using a function based upon experimental data. However, the method of calculating estimated heading error may be so adapted that the estimated heading error is calculated using a table created based upon the experimental data.

Figure 11:
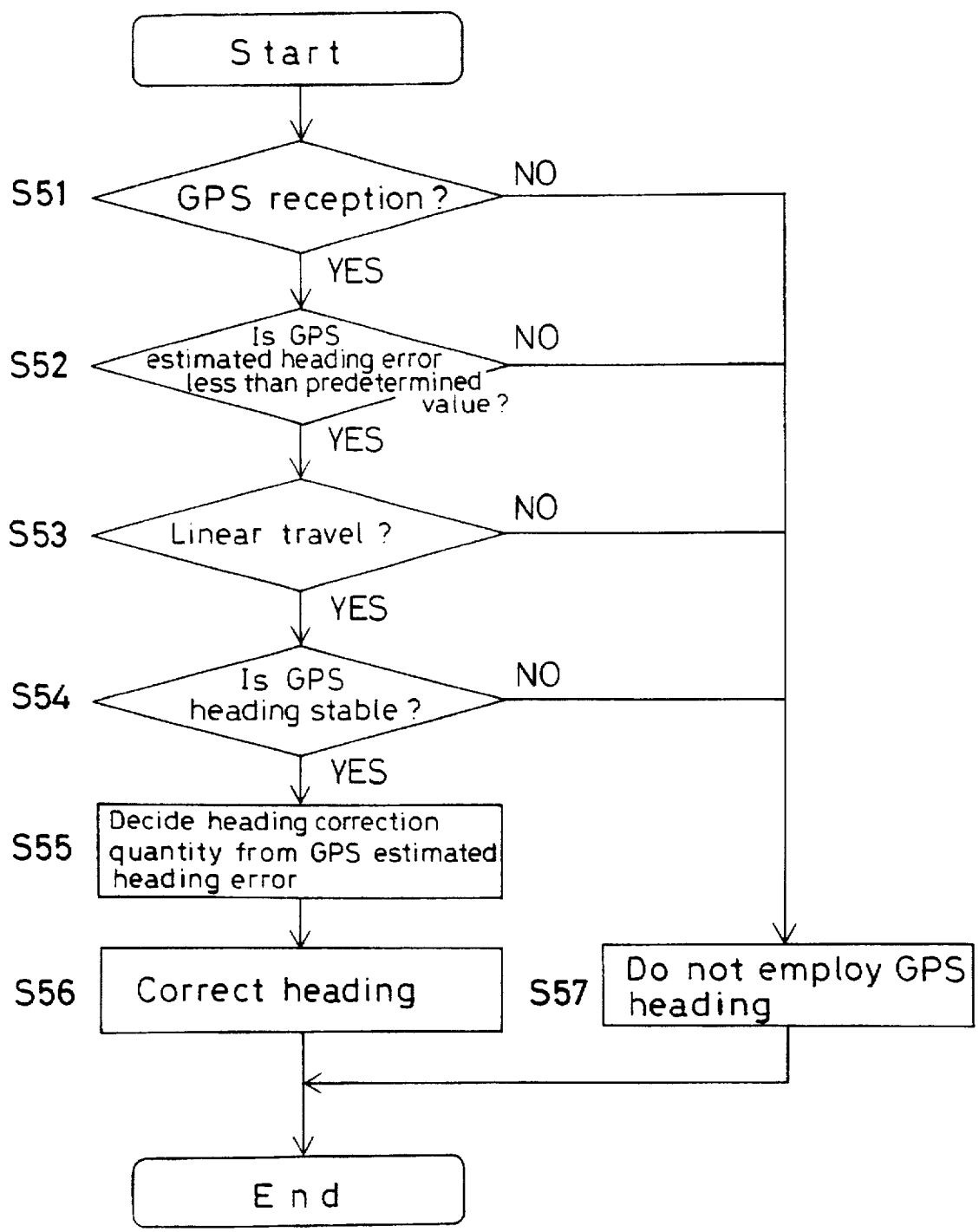
FIG. 11 is a flowchart illustrating the flow of processing for judging use of GPS heading in the vehicular navigation system according to the present invention.

Next, processing for judging whether the GPS heading is to be employed will be described on the basis of the flowchart shown in FIG. 11. First, it is determined whether a signal from a satellite has been received (step S51). If the signal has been received, it is determined whether the estimated heading error of the GPS heading calculated by the estimated heading error calculating unit 19 is less than a predetermined value in dependence upon the state of reception (step S52). If the estimated heading error is less than the predetermined value, then it is determined whether the vehicle is traveling in a straight line (step S53). If the vehicle is traveling in a straight line, then it is determined whether the GPS heading is stable or not. Specifically, the currently calculated GPS heading and the heading decided previously are compared, and it is determined whether the difference between these headings is less than the predetermined value (step S54). If all of these conditions have been satisfied, a heading correction quantity is decided based upon the estimated heading error (step S55). The correction of the estimated heading calculated by the absolute sensor 24 and/or relative heading sensor 25, which constitute heading estimating means, is performed at step S56. Accordingly, the GPS orientation is not employed in a case where the estimated heading error exceeds the predetermined value, even at high vehicle speed, the vehicle is making a left or right turn, or the currently sensed orientation has changed in excess of a predetermined value in comparison with the previously decided heading.

In this system, the present heading is estimated based upon heading sensed by the absolute heading sensor and/or relative heading sensor and the estimated heading is corrected by the GPS heading. Accordingly, in the processing of FIG. 11 for determining whether the GPS heading is to be employed, the estimated heading is not corrected if the GPS heading is no longer capable of being used; the estimated heading is utilized as the vehicle heading as is.

The decision processing steps S52, S55 and S56 function as the judging means, the correction quantity calculating means and the estimated heading correcting means, respectively, set forth in the claims.

Only a GPS heading having an excellent precision is capable of being employed by executing the decision processing which determines whether the GPS heading is to be employed. As a result, it is possible to sense the heading of the vehicle more accurately. Furthermore, a correction quantity is decided based upon the estimated heading error calculated and the headings obtained from the various heading sensors are corrected. As a result, a more accurate heading can be obtained.

The correction quantity can be calculated in accordance with Equation (2), for example, shown below.

$$\text{correction quantity} = |(\text{GPS heading}) - (\text{estimated heading})| \times \text{correction coefficient} \tag{2}$$

where the GPS heading is the heading calculated from the GPS signal, the estimated heading is the vehicle heading sensed from various heading sensors, and the correction coefficient is a coefficient for deciding the degree of correction.

FIG. 12 is a table showing the relationship between estimated heading error that has been calculated and the correction coefficient. The table indicates that if the estimated heading error is 10, the correction coefficient is ¼. Accordingly, this correction coefficient is used to calculate the correction quantity from Equation (2). This correction quantity is used in Equation (3) below to correct the sensed heading from the various heading sensors.

$$\text{corrected heading} = (\text{estimated heading}) + [(\text{GPS heading}) - \tag{3}$$

$$(\text{estimated heading})] \times (\text{correction coefficient})$$

Accordingly, only a GPS heading having a good state of reception is adopted, error is estimated with regard to the adopted heading and the estimated heading obtained from each heading sensor sensing the heading of the vehicle is corrected in conformity with this error, whereby a more accurate heading can be obtained.

The requisite elements of this embodiment will now be described with reference to FIG. 9. The signal from the GPS satellite is received by the GPS receiver 21, the disposition of the receiving satellite is sensed from the position of the receiving satellite position by the satellite position information calculating unit 215 serving as satellite position sensing means, and the vehicle speed is calculated by a vehicle speed calculating unit 218. The estimated heading error is calculated by the estimated heading error calculating unit 219, which serves as heading error estimating means, from a function found from the relationship between the prevailing satellite disposition (satellite disposition information) and vehicle speed based upon experimentation, or from a table of the relationship between receiving satellite disposition (satellite disposition information) and vehicle speed. On the basis of this estimated heading error, the judging means judges whether the calculated heading from the heading calculating unit serving as heading calculating means is to be employed or not.

The correction coefficient and correction quantity are calculated in the correcting means based upon the heading error calculated by the heading error estimating means, and the sensed estimated heading from the absolute heading sensor 24 and/or relative heading sensor 25 serving as heading estimating means is corrected in the estimated heading correcting means based upon the calculated correction quantity from the correcting means.

Figure 9:
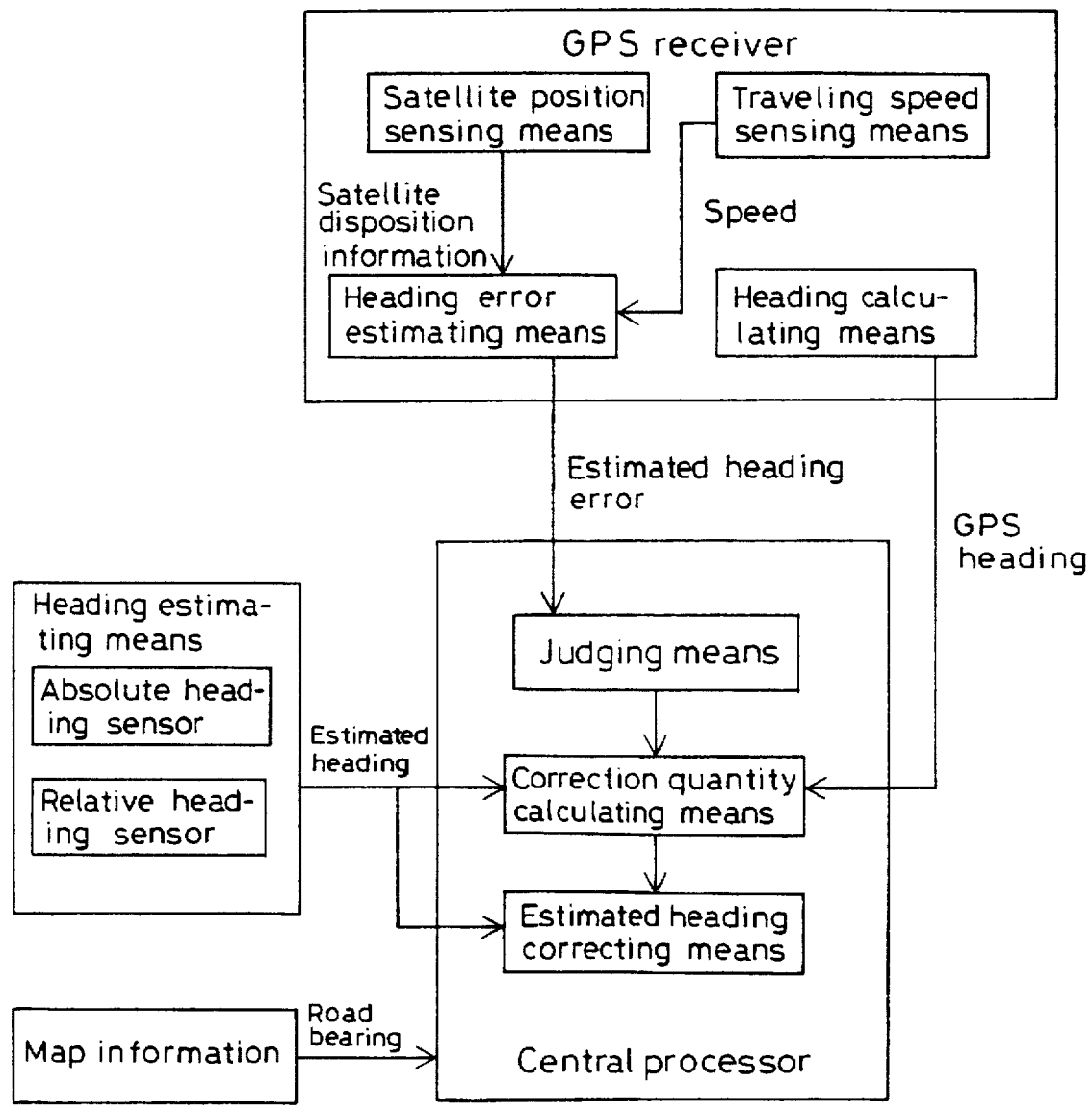
FIG. 9 is a diagram showing the arrangement of principal components of the present invention for attaining the second object of the invention.
Figure 10:
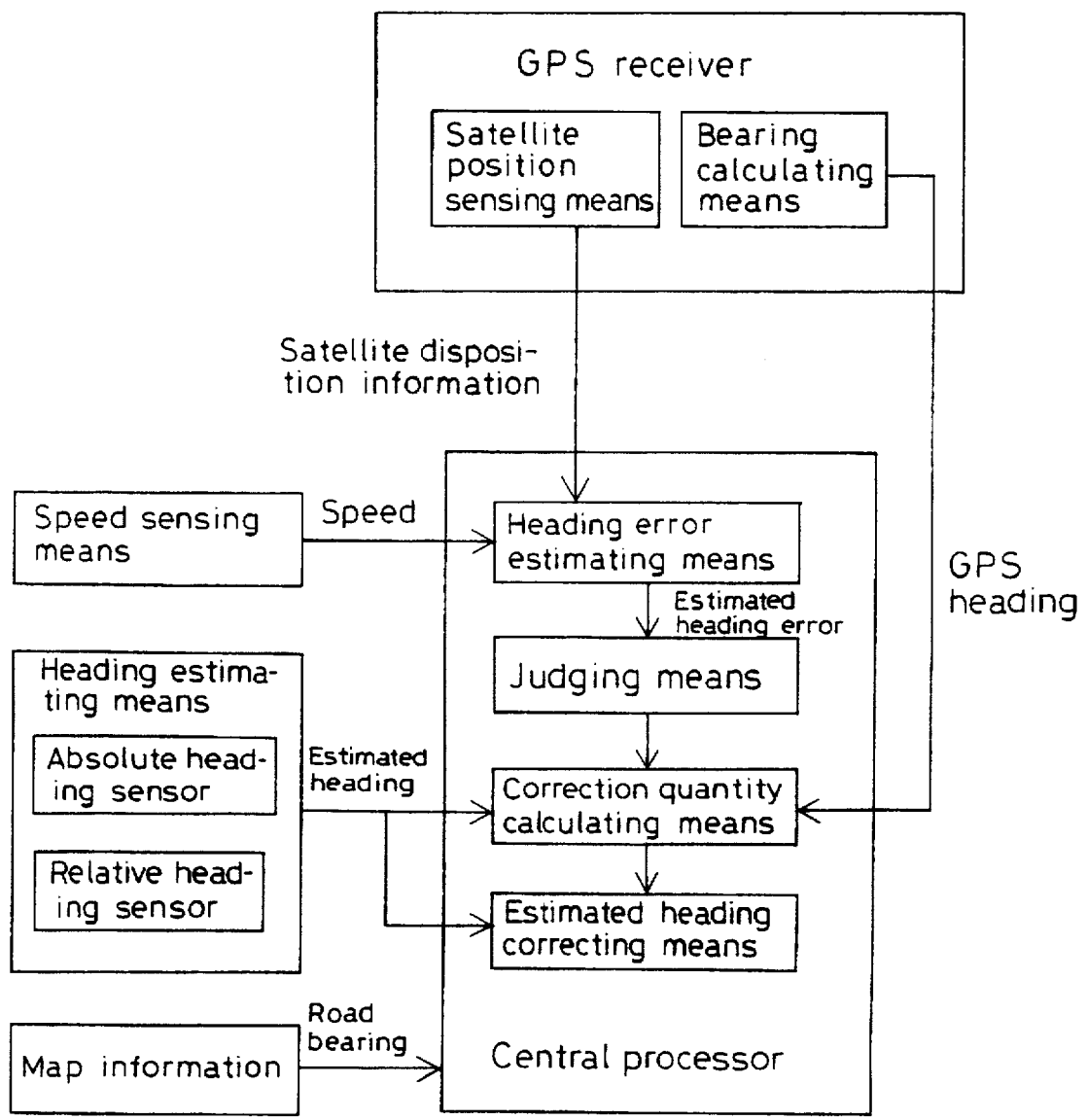
FIG. 10 is a diagram showing the arrangement of principal components of the present invention for attaining the second object of the invention.

In FIG. 9, the GPS receiver 21 is equipped with the heading error estimating means and the estimated heading error obtained is sent to the central processor. In FIG. 10, however, the necessary information (vehicle speed, disposition of the receiving satellite, etc.) is sent from the GPS receiver to the central processor and the estimated heading error is calculated within the central processor. Furthermore, in FIG. 9, speed is calculated by the speed calculating unit 218 in the GPS receiver 21 serving as traveling speed sensing means. In FIG. 10, however, the vehicle speed is sensed by traveling speed sensing means such as a vehicle speed sensor provided on the vehicle side.

In accordance with the present invention, heading is calculated based upon GPS heading and estimated heading error in which heading error with respect to the GPS heading is estimated. This is meant to supplement the conventional heading sensors. As a result, accurate heading calculating is possible. Furthermore, by making a comparison with road bearing in map information, more accurate map matching becomes possible. Accordingly, the reliability of the navigation system can be improved.

The present invention is not limited to the foregoing embodiments but can be modified in various ways. For example, though the correction coefficients are set with respect to the estimated heading errors in a table, as shown in FIG. 12, the correction coefficients may be set to 1 uniformly. In other words, it is permissible to use a correction quantity which is a value obtained by subtracting the estimated heading, which is sensed by the absolute heading sensor 24 and/or relative heading sensor 25 serving as heading estimating means, from the GPS heading calculated by the heading calculating unit 218 serving a heading calculating means.

Furthermore, in the foregoing embodiment, a judgment is made as to whether the GPS heading should be employed or not. However, in a case where the estimated heading error is large, the correction quantity may be calculated based upon the estimated heading error and the estimated heading may be corrected without using the judging means.

As many apparently widely different embodiments of the present invention can be made without departing from the spirit and scope thereof, it is to be understood that the invention is not limited to the specific embodiments thereof except as defined in the appended claims.

What is claimed is:

1. A navigation system for a vehicle, comprising:
   distance sensor for outputting pulses the number of which is proportional to rotation of a wheel;
   a GPS receiving unit for calculating vehicle speed by GPS reception;
   acquisition means for acquiring the number of pulses from the distance sensor at the same time as GPS reception;
   distance correction coefficient calculating means for calculating GPS traveling distance from vehicle speed, based upon GPS reception, at each of two arbitrary points, and a time difference between these two points, and calculating a distance correction coefficient from the GPS traveling distance and a difference in the number of pulses between the two points; and
   present position calculating means for calculating present position based upon a corrected distance correction coefficient.

2. The system according to claim 1, wherein said present position calculating means calculates the traveling distance by multiplying the difference in the number of pulses between the two points by a distance per pulse, which is preset for each vehicle, and by the distance correction coefficient.

3. The system according to claim 2, wherein said distance correction coefficient calculating means calculates, from the GPS traveling distance and the difference in number of pulses, the number of pulses necessary to advance the vehicle a unit distance, and calculates the distance correction coefficient according to the formula

|(unit distance)/(number of pulses necessary to advance one unit distance)|/(distance per pulse).

4. The system according to claim 1, wherein traveling distance based upon the GPS is calculated by multiplying the average value of vehicle speed, which is based upon GPS reception, at the two points by the time difference.

5. A navigation system for vehicles according to claim 1, wherein said GPS receiving unit outputs a vehicle speed signal, and a distance correction factor is calculated in case the vehicle speed between two points is higher than a predetermined speed.

6. A navigation system for vehicles according to claim 5, wherein said GPS receiving unit outputs a vehicle speed signal, and a distance correction factor is calculated when a difference of the vehicle speed between two points is within a predetermined speed difference.

7. A navigation system for vehicles according to claim 6, wherein said GPS receiving unit outputs a heading signal, and a distance correction factor is calculated in case an angular change between two points is within a predetermined angle.

8. A navigation system for vehicles according to claim 7, wherein said GPS receiving unit outputs a time signal, and a distance correction factor is calculated when an angular change between two points is within a predetermined angle.

9. A navigation system for vehicles according to claim 8, wherein said GPS receiving unit outputs a status signal received from an artificial satellite, and a distance correction factor is calculated when two points received from said status signal are at positions in the same dimension.

10. A navigation system for vehicles according to claim 1, wherein said GPS receiving unit outputs a vehicle speed signal, and a distance correction factor is calculated in case a difference of the vehicle speed between two points is within a predetermined speed difference.

11. A navigation system for vehicle according to claim 1, wherein said GPS receiving unit outputs a heading signal, and a distance correction factor is calculated when an angular change between two points is within a predetermined angle.

12. A navigation system for vehicles according to claim 1, wherein said GPS receiving unit outputs a time signal, and a distance correction factor is calculated when an angular change between two points is within a predetermined angle.

13. A navigation system for vehicles according to claim 1, wherein said GPS receiving unit outputs a status signal received from an artificial satellite, and a distance correcting factor is calculated when two points received from said status signal are at positions on the same dimension.

14. The system according to claim 1, further comprising:
   heading calculating means for calculating heading of the vehicle based upon a signal from said GPS receiving unit;
   satellite position sensing means for sensing the position of the satellite based upon the signal from said GPS receiving unit;
   travel speed sensing means for sensing the travel speed of the vehicle;

heading error estimating means for estimating error in the heading, obtained by said heading calculating means, based upon the traveling speed obtained by said travel speed sensing means and the position of the satellite obtained by said satellite position sensing means; and judging means for judging whether the estimated heading error, which has been estimated by said heading error estimating means, is less than a predetermined value;

wherein the heading calculated by said heading calculating means is employed when the estimated heading error is less than the predetermined value.

15. The system according to claim 1, further comprising:

heading calculating means for calculating heading of the vehicle based upon a signal from said GPS receiving unit;

satellite position sensing means for sensing the position of the satellite based upon the signal from said GPS receiving unit;

travel speed sensing means for sensing the travel speed of the vehicle;

heading error estimating means for estimating error in the heading, obtained by said heading calculating means, based upon the traveling speed obtained by said traveling speed sensing means and the position of the satellite obtained by said satellite position sensing means;

judging means for judging whether the estimated heading error, which has been estimated by said heading error estimating means, is less than a predetermined value;

heading estimating means for estimating heading of the vehicle;

correction quantity calculating means for calculating a correction quantity that is for correcting the estimated heading, estimated by said heading estimating means, based upon the heading calculated by said heading calculating means and the estimated heading error estimated by said heading error estimating means; and heading correcting means for correcting the estimating heading, estimated by said heading estimating means, based upon the correction quantity calculated by said correction quantity calculating means.

16. The system according to claim 1, further comprising:

heading calculating means for calculating heading of the vehicle based upon a signal from said GPS receiving unit;

satellite position sensing means for sensing the position of the satellite based upon the signal from said GPS receiving unit;

traveling speed sensing means for sensing traveling speed of the vehicle;

heading error estimating means for estimating error in the heading, obtained by said heading calculating means, based upon the traveling speed obtained by said traveling speed sensing means and the position of the satellite obtained by said satellite position sensing means;

judging means for judging whether the estimated heading error, which has been estimated by said heading error estimating means, is less than a predetermined value;

heading estimating means for estimating heading of the vehicle;

correction quantity calculating means which, when it is judged by said judging means that the estimated heading error is less than the predetermined value, is for calculating a correction quantity that is for correcting the estimated heading, estimated by the heading estimating means, based upon the heading calculated by said heading calculating means and the estimated heading error estimated by said heading error estimating means; and heading correcting means for correcting the estimated heading, estimated by said heading estimating means, based upon the correction quantity calculated by said correction quantity calculating means.

* * * * *